Figure 1:
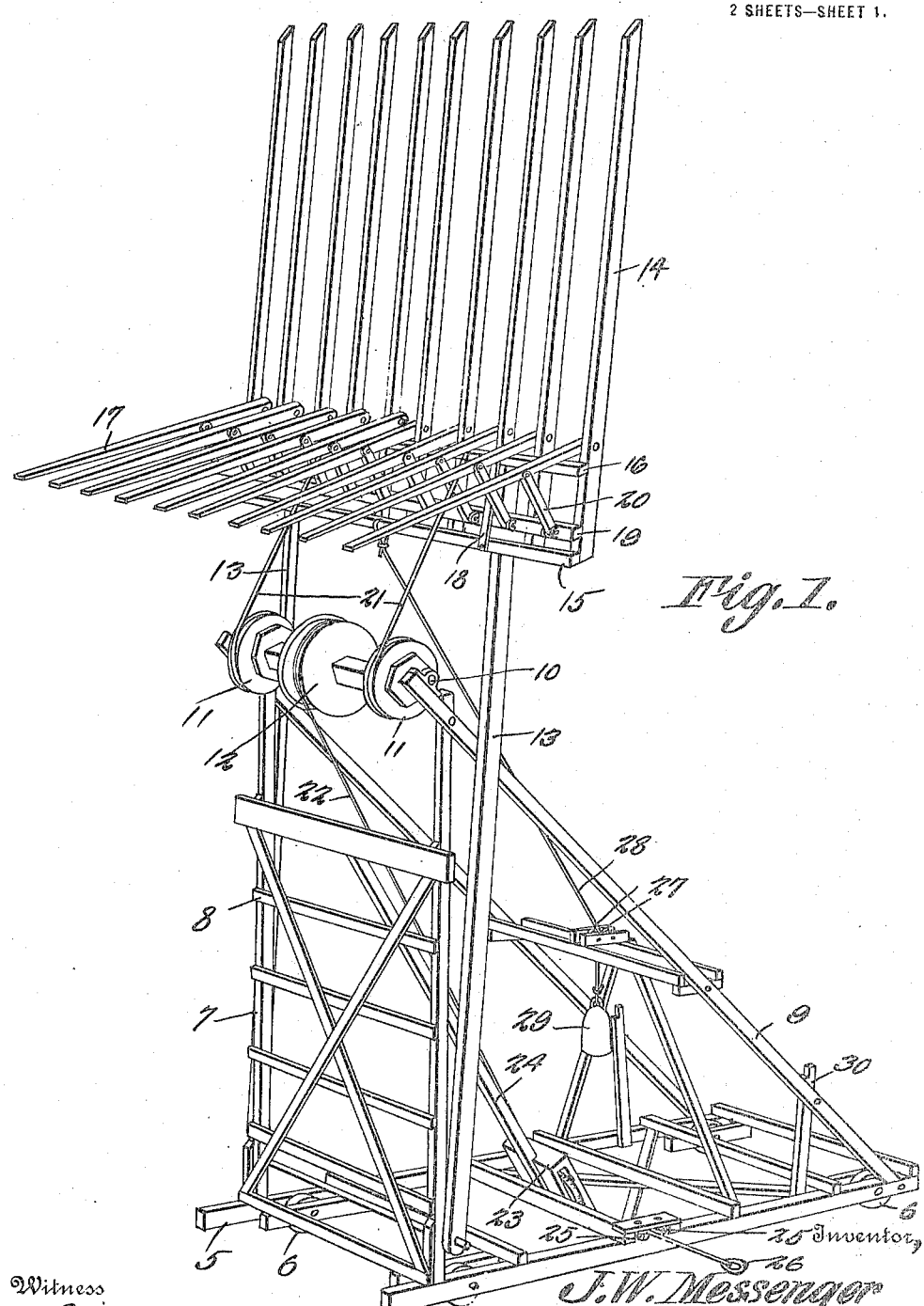

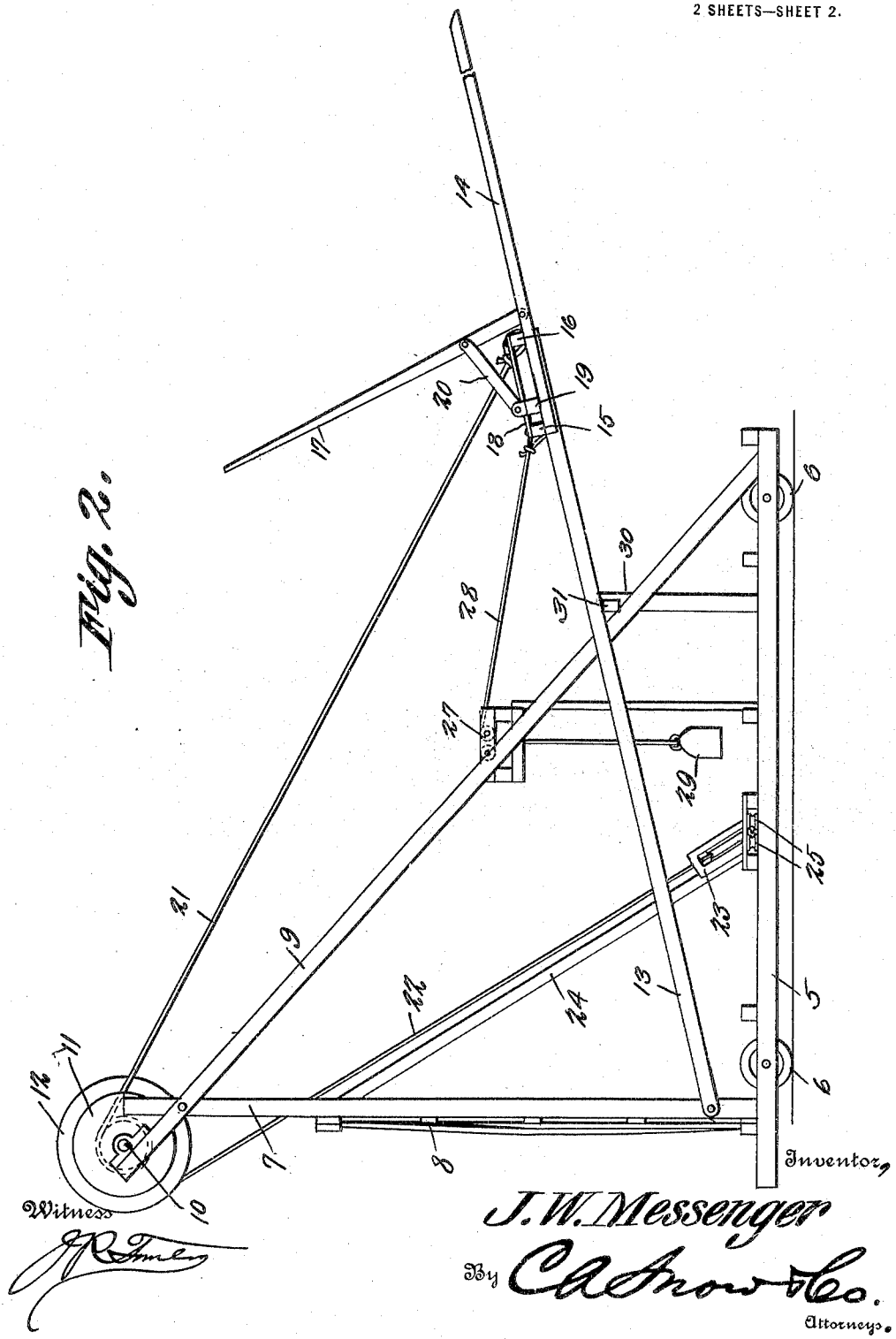

UNITED STATES PATENT OFFICE.

JOHN W. MESSENGER, OF BURWELL, NEBRASKA.

HAY-STACKER.

1,322,040.  Specification of Letters Patent.  Patented Nov. 18, 1919.

Application filed February 28, 1919. Serial No. 279,682.

*To all whom it may concern:*

Be it known that I, JOHN W. MESSENGER, a citizen of the United States, residing at Burwell, in the county of Garfield and State of Nebraska, have invented a new and useful Hay-Stacker, of which the following is a specification.

My invention relates to hay-stackers and its principal object is to provide a hay stacker which is portable and which does not require stapling down or guy ropes.

A second important object of the invention is to provide a hay stacker which will do a maximum amount of work and at the same time will only require a minimum amount of time and labor.

Another important object of the invention is to provide a device including a hay stack having means associated therewith for automatically assisting the fork to a position to be loaded and unloaded.

Another object of the invention is to provide a hay stacker which is simple in construction, consists of few parts which are not likely to become out of order, and which may be manufactured and placed on the market at a nominal cost.

Other objects and advantages of the invention will become apparent from the following specification and accompanying drawing.

The invention consists of constructions, combinations, arrangement of parts, operations, and general assemblage which will be set forth in detail hereinafter:

In the drawing:

Figure 1 is a perspective of a hay stacker constructed in accordance with my invention, and showing the hay fork in a position after the hay has been released therefrom, and Fig. 2 is a side elevation of the machine, the hay fork being shown in an inoperative position.

Referring in detail to the drawing, the numeral 5 designates a rectangular frame which is mounted upon rollers or wheels 6.

Extending vertically from the frame at one end thereof is a pair of parallel standards 7, which are connected by cross bars 8. Angularly disposed brace rails 9 are provided which are connected with the upper ends of the standards 7 and the forward end of the frame 5. The ends of the brace rails which are connected with the standards 7 extend beyond the same and support a shaft 10 therein. Mounted to rotate with this shaft 10 is a pair of pulley drums 11. Also mounted on this shaft is a drive drum 12 which is adapted to impart motion to the shaft 10.

Pivotally connected with the vertical standards at their lower ends and adapted to be swung in a vertical plane are arms 13. The hay fork proper consists of a plurality of parallel tines 14 which are connected together by a cross bar 15 and which is connected with the ends of the arms 13. A second bar 16 extends across the tines in spaced relation to the bar 15 and is connected with the tines. Normally at substantially right angles to the tines 14 is a second set of tines 17 which are connected with these tines 14. Connecting the bars 15 and 16 are guides 18. Slidable in these guides 16 and between the cross bars 15 and 16 upon the tines 14 is a bar 19 which has pivotal connection with a plurality of links 20 that are pivotally connected with the tines 17 consequently when the fork is arranged in a substantially horizontal position, the tines 17 may be swung forwardly toward the free ends of the times 14 to engage with a load of hay positioned upon the latter. When the rack is swung and reaches a substantially perpendicular position with relation to the ground, the tines 17 will swing downwardly to be arranged obtusely with relation to the tines 14 so as to facilitate the removal load from the tines 14 and cast the load upon the stack.

Adapted to be wound upon the pulleys 11 is a pair of cables or flexible elements 21 which are connected with the bar 16. A like flexible element 22 is adapted to be wound upon the pulley wheel 12. This flexible element 22 extends around an inclined pulley in the housing 23 on the brace 24 and thence between pulleys 25 on the frame 5 and has a ring 26 secured to the end thereof whereby the hay fork is operated.

Engaged between pulleys 27 supported on cross supports 27' secured to the rails substantially intermediate the ends thereof is a flexible element 28 which is attached to the cross bar 15 and has a weight 29 suspended therefrom. From this construction it is obvious that the hay fork will return to the horizontal position after the load has been released from the fork and the fork will be assisted in raising by the weight.

Extending vertically from the frame 5 at its forward end is a pair of short notched posts 30 which are adapted for engagement with the removable bar 31 when the machine is not in use and retain the same in the position shown in Fig. 2.

This disclosure is merely illustrative and it is to be understood that the invention may be modified in many different respects and that my limits of modification are only governed by the appended claims.

What is claimed is:

1. In a hay stacker, a frame, a pair of vertical standards mounted thereon, a pair of arms pivoted to the standards and capable of vertical swinging movement, a plurality of rigid tines carried by the arms, a bar slidable on said tines, and a plurality of tines pivotally connected with the first mentioned tines and to the slidable bar.

2. A hay stacker, comprising a frame, a pair of vertical standards mounted thereon, a pair of arms pivoted to the standards and capable of vertical swinging movement, a plurality of rigid tines carried by the arm, a pair of spaced cross bars secured to said tines adjacent their rear ends, a plurality of tines pivotally connected to the stationary tines forwardly of said cross bars, a bar slidable on the stationary tines between said cross bars and links pivotally connected to said slidable bars and pivoted tines for governing the movement of said movable tines.

In testimony that I claim the foregoing as my own, I have hereto affixed my signature in the presence of two witnesses.

JOHN W. MESSENGER.

Witnesses:
FLOYD HARTFORD,
PAUL F. LAVERTY.